(12) United States Patent
Bronstein et al.

(10) Patent No.: US 8,285,118 B2
(45) Date of Patent: Oct. 9, 2012

(54) METHODS AND SYSTEMS FOR MEDIA CONTENT CONTROL

(76) Inventors: Michael Bronstein, Santa Clara, CA (US); Alexander Bronstein, San Jose, CA (US); Shlomo Selim Rakib, Cupertino, CA (US)

( * ) Notice: Subject to any disclaimer, the term of this patent is extended or adjusted under 35 U.S.C. 154(b) by 840 days.

(21) Appl. No.: 12/350,889

(22) Filed: Jan. 8, 2009

(65) Prior Publication Data

US 2010/0011392 A1    Jan. 14, 2010

Related U.S. Application Data

(63) Continuation-in-part of application No. 11/778,633, filed on Jul. 16, 2007, and a continuation-in-part of application No. 11/944,290, filed on Nov. 21, 2007, now Pat. No. 8,170,392.

(60) Provisional application No. 61/045,278, filed on Apr. 15, 2008.

(51) Int. Cl.
*H04N 9/80* (2006.01)

(52) U.S. Cl. ................................................ 386/262
(58) Field of Classification Search ............... 386/248, 386/262; 725/25, 27, 28
See application file for complete search history.

(56) References Cited

U.S. PATENT DOCUMENTS

| | | | |
|---|---|---|---|
| 2002/0028021 A1* | 3/2002 | Foote et al. | 382/224 |
| 2003/0093790 A1* | 5/2003 | Logan et al. | 725/38 |
| 2009/0238460 A1* | 9/2009 | Funayama et al. | 382/181 |
| 2010/0003005 A1* | 1/2010 | Sugihara et al. | 386/4 |

* cited by examiner

*Primary Examiner* — Thai Tran
*Assistant Examiner* — William Tran
(74) *Attorney, Agent, or Firm* — Stephen E. Zweig

(57) ABSTRACT

The described systems and methods control the display of media content on a media player with player preferences. The media content is analyzed and multiple signatures are computed that are representative of temporal portions of the media content. The multiple signatures are matched to a database of signatures, and a closest corresponding signature is found. Metadata associated with the closest corresponding signatures is retrieved as matching metadata. Display of the media content is controlled based on the player preferences and the matching metadata.

30 Claims, 13 Drawing Sheets

METHODS AND SYSTEMS FOR MEDIA CONTENT CONTROL

RELATED APPLICATIONS

This application claims the priority benefit of U.S. provisional patent application 61/045,278, "Video Genomics: a framework for representation and matching of video content", filed Apr. 15, 2008, the disclosure of which is incorporated by reference herein. This application is a continuation in part of, and claims the priority benefit of, U.S. patent application Ser. No. 11/778,633 "Method and Apparatus for Video Digest generation", filed Jul. 16, 2007. This application is also a continuation in part of, and claims the priority benefit of, U.S. patent application Ser. No. 11/944,290 "Method and apparatus for generation, distribution, and display of interactive video control", filed Nov. 21, 2007. The disclosure of Ser. Nos. 11/778,633 and 11/944,290 are incorporated by reference herein.

BACKGROUND

Owners and operators of video clients, players, and display devices often wish to maintain control over the content that is being displayed on these devices. Usually this is done by rating video as to content, differentially authorizing or not authorizing the content, and then restricting the playback of video media that has a non-authorized content rating.

Many different types of content rating exist. As one example, parents often desire to prevent their young children from being exposed to potentially disturbing video content which may have an unacceptably high violence or sexual content. As a result, one of the most common examples of content control is parental control of video content that is being played in a home setting.

To facilitate such parental control of video content, the Motion Picture Association of America (MPAA) has instituted a motion picture rating system that rates video content in terms of its level of appropriateness for children, adolescents, and adults. The MPAA content rating scheme rates video content as "G" (suitable for general audiences), PG (Parental Guidance Suggested), PG-13 (Parents strongly cautioned), R (Restricted, no children under 17 without a parent or guardian), and NC-17 (No Children 17 or under admitted). The actual MPAA rating mechanism is somewhat arbitrary and subjective, but generally sexually derived words, drug references, sexual content, and violence are associated with a more mature ratings.

In addition to parents, other groups and organizations occasionally desire to control video content as well. Corporations occasionally wish to restrict employee viewing to work related material. Sports team owners may occasionally wish to black out local broadcasts of sports games in order to improve gate sales. Plaintiffs may wish to block viewing video media containing libelous material. Copyright holders may wish to block viewing of illicitly copied material. At an extreme level of censorship a government may even wish to restrict a population from viewing material that contains political content that the government considers to be objectionable.

Depending on the target audience, the same video content can be produced in multiple versions, typically by removing portions of the video unsuitable for a certain rating category. It is common that a movie released on DVD or other read-only media has multiple versions with different ratings. The user can purchase the version with the rating he or she is interested in. This type of rating is fixed at the time of production and cannot be altered.

Existing methods of video content control included the "V-Chip" system. This system, which was originally introduced for analog television, relies upon a special "content rating" message that is embedded in the television program signal. In the case of analog TV, this rating message is transmitted in the vertical blanking interval between television frames. The V-chip detects this rating message, compares the rating message with the pre-set acceptability criteria programmed into the television (often by the parent that owns the television), and displays or blocks viewing of the program as appropriate. Thus, the same video content can be presented in different ways depending on the rating settings of the player.

One drawback of the V-chip system, and other similar content control systems, was that these systems relied on a video rating message that was transmitted along with the video media that was being viewed. The difficulty here is that most video media is unrated. Moreover, even if the video media is rated, the rating may not be appropriate for the needs of the particular user or organization. For example, a parent may have a high tolerance for violence but a low tolerance for sexual content, and thus may find the MPAA rating system inappropriate for his or her family. A copyright holder wishing to block access to unauthorized content will also find the V-chip and MPAA system to be inappropriate.

The viewer of media may also wish to employ automated content control methods. For example, a video viewer might prefer to delegate judgment as to what video media is or is not suitable for viewing to a non-official third party. For example, an intellectually inclined family might want to automatically delegate video content control to a third party organization that rates video as to intellectual content (i.e., a "consumer advocate" for video content). However, existing media control methods were incapable of allowing such flexible delegation methods.

An additional disadvantage of existing systems is that the rating information is embedded into the media content itself. This implies that legacy content not containing such information cannot be filtered by a player with content control capabilities. As a result of these and other deficiencies, existing video content control methods tended to be unsatisfactory, and tended to have limited market acceptance.

SUMMARY

The systems and methods described herein address the long felt need for more flexible video content control that can handle a much wider variety of video sources and content rating systems, without the need to transmit or store the rating information together with the video content itself. Additionally, the described systems and methods provide for the separation of the video content source from the rating source. The video content source can be an existing video distribution scheme or stored legacy content not providing for embedded rating information. The proposed content control methods and systems are capable of analyzing the video to be played on a local video player, compute a signature (alternatively referred to as "hash function" or "video DNA") and determine the rating for each portion of the video by comparing the signature to a metadata database that contains reference signatures and associated content rating information.

The signature is computed from the video content itself and does not depend on any outside information. This way, any video can be rated, including legacy content stored on read-only media such as DVD, provided that there is a corresponding metadata in the database. The signature is also insensitive to modifications and editing of the video content. For example, a DVD version of "Casablanca" and the same movie recorded from a TV broadcast may differ by compression format, resolution, frame rate, aspect ratio, and may also differ as a result of advertisement insertions and overlay of channel logo and subtitles. The way the signature is generated and the signature matching algorithms discussed herein provide for invariance and insensitivity to such modifications.

After receiving the metadata, the system then compares the content rating information of interest with a preset list of appropriate content that is associated with the video, and then either shows or does not show the video or its portion depending upon the match between the database content and the preset appropriate content list.

At one level, the described systems and methods are implemented in a video media player. A typical video media player has several components. One component can be a video media player client that is capable of playing back video and audio signals from either local or remote media file or stream. The video media player client will usually also have configurable viewing preferences, which determine, for example the level of content rating allowed to be viewed. The video media player client will often have a processor and associated software that can analyze the video and compute a signature that can uniquely identify the particular temporal portion of the video, for which the rating is to be determined.

The video media player client will have the capability to communicate with the metadata database, in order to match the video signature computed for the played content with a set of reference signatures. The result of matching retrieves metadata describing the rating of a specific portion of the video played on the client. The matching process also compensates for possibly different timeline of the reference and the currently played video which may result from video modifications and editing. Although this database will often reside on a remote server, in some embodiments the database may be present on or near the video media player client itself. The retrieved video rating information can then be compared to the player preferences, and the video then shown or not shown as desired.

A significant advantage of the described systems and methods is that the metadata database that contains the reference video signatures and rating information does not need to contain the actual video media. From a legal perspective, this distinction is extremely important. Video signatures are typically not subject to copyright laws, since they do not carry visual information (there is no way to reproduce the video from the signatures), while the video media itself is typically covered by copyright laws.

Thus, third parties, who do not themselves own the underlying copyrights to the video media may still provide content control for video media without the legal necessity of procuring owner authorization. The described systems and methods enable nearly anyone, such as private individuals, private organizations, companies, and governments, to legally produce and publish their own particular video content control database. For example, a movie critic could provide a web server that, to appropriate subscribers, automatically directs the subscriber's video players (clients) to only display video content that the critic has approved. A "consumer advocacy" group or religious organization could also produce and publish (via the Internet or other means) their own content control scheme.

Additionally, the systems and methods described herein allow each user to enjoy their legally owned video content, without the necessity of sharing it with others in the community (e.g., other users living in the same household). The user may have a library of DVD movies at home, which may contain portions unsuitable for children, and would like to prevent the display of such portions. Further, even pirated or illegal copies of the video, such as those downloaded from peer-to-peer networks, can be controlled.

The separation between the video content and the metadata allows altering of the rating information independently of the video content itself. For example, if an organization decides to change the rating of a movie, existing solutions need to modify the media, since the video content and the rating are transferred together. This is impossible with read-only media. In the described systems and methods, there is no need to re-encode the video, but just to modify the metadata on the server. The user may even be unaware of such a modification.

Another type of content control enabled by the described systems and methods is an automatic method to only allow access to video media that is judged to be highly popular by a particular peer group, i.e., some kind of community filtering. For example, viewers may decide to slave their viewing preferences to a video content control version of the web site "del.icio.us" or "dig.com". Thus, the systems and methods described herein will allow users to help cut through the clutter generated by the huge array of video media, and allow them to focus on that subset of media most appropriate to their particular interests. The described systems and methods also allow new types of video content control businesses to be created that cater to the interests of various viewing groups.

DETAILED DESCRIPTION

One of the key components of the systems and methods described herein is a synchronization mechanism between the video content on the client side and the metadata on the server side. The synchronization is performed based on the content itself, making it independent of the content format, distribution, compression, edition, etc.

In a typical use case, on the server side, there is a database containing video signatures and associated rating data. Each time and individual or entity wishes to add a new title to the database, the video undergoes a one-time process of signature generation. The signature is synchronized with the video timeline and is stored in the database, while the video itself is not stored in the database. In addition, rating information synchronized with the timeline is also stored in the database.

On the client side, a potentially modified version of a video indexed in the database is played. First, the identity of the video is usually not known in advance. Second, if the video is modified, its timeline may be different from one for which the annotation is stored on the server side. The content-based synchronization mechanism provides a solution to both of the above problems. First, it provides a way to identify the played video identity without resorting to any outside information but rather based on the content itself. Second, it compensates for the difference in the client- and server-side timeline.

The synchronization relies upon the generation and matching of video signatures. A video signature can be thought of as a hash function uniquely identifying a portion in the video sequence. As will be discussed later, although many video signature methods may be used for the invention, a particular signature method is called the "Video DNA". This method was previously discussed in copending application 61/045,278, "Video Genomics: a framework for representation and matching of video content", filed Apr. 15, 2008, the disclosure of which is incorporated by reference herein. Key aspects of this video signature process, and in particular the Video DNA signature method, are discussed in greater detail herein.

Figure 1:
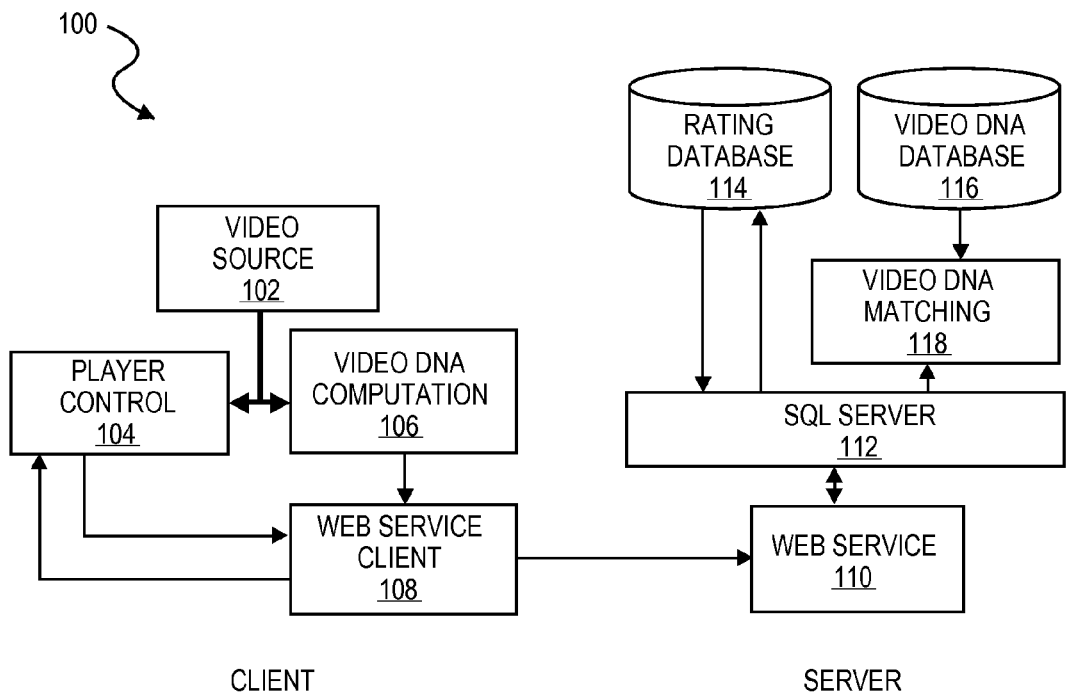
FIG. 1 shows an example content control system architecture.

FIG. 1 shows an example content control system architecture 100. The example of FIG. 1 includes a client side (the left side of the figure) and a server side (the right side of the figure). The client is a media player capable of playing video from a variety of video sources 102, such as local or remote video files or streams, and read-only media such as DVD, Blu-ray Disc™, and the like. The client includes a player control component 104 which, in addition to standard media playback control functions such as play/pause, stop, navigation (seek/fast forward/backward), is capable of reacting to rating information. In typical use cases, reaction to rating information is done by blocking the display of undesired content or skipping the undesired content. This is done by having a configurable set of preferences, which act as a filter determining the level of rating acceptable by the player.

For example, a parent may program the client video player content viewing preferences to only show video with "G" rated MPAA content, or a corporation may program its client video player content viewing preferences to only show video with a "business" content viewing criteria, and so on. This list of viewing preferences can be stored in the client video player's memory, in a remote viewing preferences database that is linked to the client over a network, or by other means. The term "viewing preferences" may also be referred to as "viewing criteria".

The client also has a video DNA computation module 106, an input to which is the video content (potentially pre-processed by standard image processing algorithms such as resolution, frame-rate and colorspace change) and an output from which is the video DNA. Video DNA computation module 106 is responsible for computing a video signature based on the video content. The video DNA computation process can be carried out in real-time during the video playback or in advance as a pre-computation stage. The client also has a web service client 108, whose function is to communicate with the server side. Typically, the communication consists of sending video DNA and receiving rating information. In one of the embodiments, this is a web service, and the server is a remote network resource.

In use, the client or video player will typically examine the video content about to be played, and compute a video signature of various time segments from the video content. This video signature (often using the video DNA process, which is robust to changes in resolution, frame rate, cropping, and segment deletions and insertions) of the various video time segments will then be compared with a database of reference video signatures. Here, the signature of the video content can essentially be used as an index key to look up the portion of the reference video that corresponds to the portion of the video content about to be played by the client. Once this correspondence has been found, the database can then be queried, and the content metadata associated with the corresponding portion of the reference video can be retrieved and transmitted to the client.

The client in turn can compare the retrieved video content metadata with its own list of viewing preferences, and take appropriate action such as playing the video content, jumping past a non-desired portion of video content, blanking out the display screen, showing the non-desired portion of the video at higher speeds or lower resolution, etc. For example, the client may be a video display with a DVD or Divx player, and a parent may have configured the unit using the MPAA (G, PG, PG-13, R, and NC-17) rating method with a list of viewing preferences that only allows videos having an MPAA rating of PG-13 or lower to be played. Using this scheme, a child might try to load a bootleg (illegally copied) DVD or Divx file that contains no obvious video identification onto the player. The player will scan the bootleg DVD or Divx file, construct video signatures, and send these signatures to a server. The server in turn can analyze the video signature, determine that portions of the video are PG-13, but other portions are NC-17, and send the rating information for these portions back to the player. The player will compare the content rating from the server (mixed PG-13 and NC-17) to its internal list of viewing preferences (PG-13), and either refuse to play the bootleg DVD, or alternatively play only the PG-13 portions of the bootleg DVD, and skip over the NC-17 content. The algorithm here can be:

If content (from server)<=preset content preference list, then play, else skip.

Referring again to FIG. 1, the server side contains two databases: a rating database 114 and a database of reference video DNAs 116, collectively referred to as "metadata". The video DNAs are time-ordered sequences, and the ratings are synchronized with their timelines. This can be done by a variety of methods, such as by associating the video signatures and the reference video in a database with links connecting the video signatures and the video content metadata associated with the video signatures, or by other methods. Such databases include commonly used hierarchical, network, or relational databases, as well as post-relational databases and object databases. These databases are usually stored in volatile or non-volatile memory, and often achieve high speed by way of indexing. The systems and methods described herein are particularly useful because the video signatures are well suited for this purpose. Examples of suitable database management systems include dBase, Firebird, Oracle, Microsoft Access, Microsoft SQL server, MySQL, SQLite, and so forth.

Video DNA database 116 and associated video content can then be stored in a variety of different ways. Video DNA database 116 may reside in a memory (such as a hard drive, RAM, flash memory, or other memory) of a server designed to serve content data in response to video signature queries from a remote client over a network such as the internet Alternatively, Video DNA database 116 may be published in a portable format, such as on a memory card, CD, DVD, Blu-ray Disc™, or other portable data storage device. Further, Video DNA database 116 can be transmitted using any transmission format to clients for use directly or indirectly by the client or other user.

The organization of Video DNA database 116 allows efficient storage, retrieval and modification of the metadata. In addition, efficient matching of the video DNA is supported.

Another module on the server side is a video DNA matching module 118. Receiving a portion of video DNA from the client, its role is to find the best matching portion of the video DNA in Video DNA database 116. Typically, the matching process will be implemented as part of the database query, e.g. using an SQL server 112. Finally, there is the server-side part of the web service (identified as web service 110), which is responsible for communicating with the client.

Metadata plays an important role in the proposed scheme of content control. The metadata consists of two components: video signature (e.g., video DNA) and content rating. Both components are synchronized with the video content timeline. Initially, the reference video is analyzed producing a video signature, often using the video DNA methods, or other methods that will be described later. Typically, during this process, the reference video is broken down into smaller temporal segments, often encompassing a number of individual video frames. Usually such segments will encompass from a fraction of a second to, at most, a few seconds. The number of individual video frames per time segment will vary according to the time length and video frame rate. In some implementations, every frame is sampled, but in other implementations, not every frame is sampled (e.g., only every second or third frame is sampled). Time segments can be overlapping or non-overlapping, of constant length or of variable length. The video signature is a temporal sequence corresponding to these intervals. For example, video DNA can be represented as a string of "letters". Each of the letters describes a temporal segment. The content rating is also provided for each temporal segment.

The content rating can be derived by a wide variety of methods. Some content rating can be derived by manual and somewhat subjective human methods, such as the MPAA ratings content, or political content, etc. Other content rating can be derived by an automated process, for example, by scanning the image for content sensitive symbols, faces, body parts or objects, or scanning the sound portion of the video signal for content sensitive words. Content rating can also be generated by a voting process (e.g., users rating video for popularity via a network such as the internet). This voting process can be either open to all users, or alternatively restricted to members of a particular group, such as media critics, content rating companies, educational organizations, religious organizations, and the like.

Figure 2:
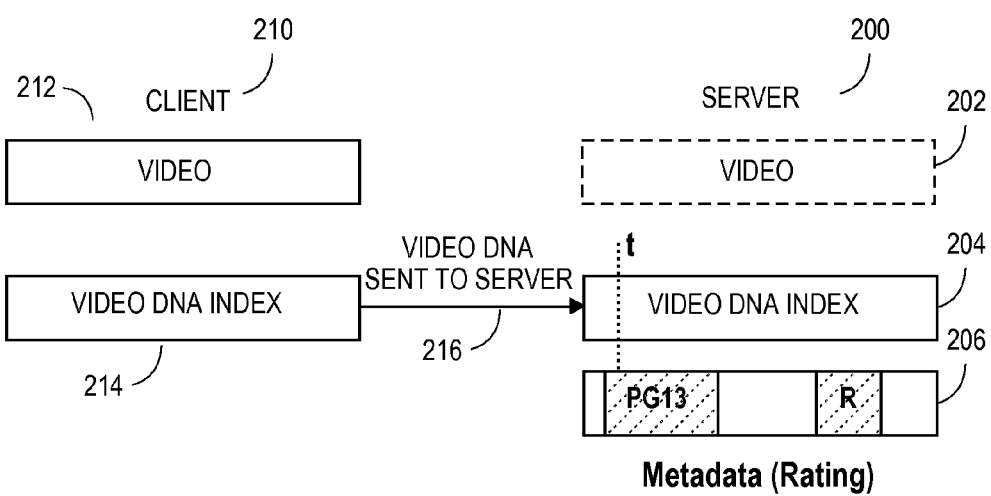
FIG. 2 shows an example of server side and client side video DNA creation and video content annotation.

An example of the initial video signature and content annotation process is shown in FIG. 2. Note that for nearly all of the specific figures and examples discussed herein, the video DNA method of producing signatures of video snippets will be used as a specific embodiment. However, alternative video signature methods, such as hash functions on the binary video image data for the video snippet, may also be used.

The video signature and content annotation process typically starts at the content database creation side (here termed the server side) (200), where the video content (202) is first processed and rated. During this first stage of processing, a video signature index (here the term video DNA index will be used throughout) (204) corresponding to the video media signatures is computed. Content metadata containing the rating information corresponding to different portions of the video content (206) is also created by a different process (e.g., human rating process, etc.). This content metadata and the video DNA index are stored in a database which may reside on a server or in any other type of data storage device. Note however that the original video content (202) does not need to be stored on the server, and this lack of a need to have the original (reference) video content is shown by the broken line surrounding video content (202).

As previously discussed, the lack of a need to store the original or reference video content has a number of important legal and business consequences. Although the video content (202) is subject to media copyright restrictions, the video signatures (video DNA index) (204) and the rating metadata (206) will usually not be subject to the same media copyright restrictions. Thus, the server database allows a user, for any given time location "t" in the video, to retrieve the metadata associated with time "t".

Using this server, a client side user (210) can watch a client side video content (212) that is similar to (but not necessarily identical to) the reference video that was originally annotated on the server side (202). The client side video (212) may be a modified version of the reference server side video (202), with different spatial resolution, frame rate (temporal resolution), or inserted or deleted portions. For example, it may be a Divx or MP4 lower fidelity copy of the original reference video. The client in turn can generate video DNA or other video signature (214) that corresponds to the scene that is being watched on the client side, and send this client side video DNA signature over to the server as an index key to match up with the video DNA index on the server side. This client side video DNA signature can be sent (216) to the server on either a real-time basis, or buffered and sent on a non-real time basis.

Figure 3:
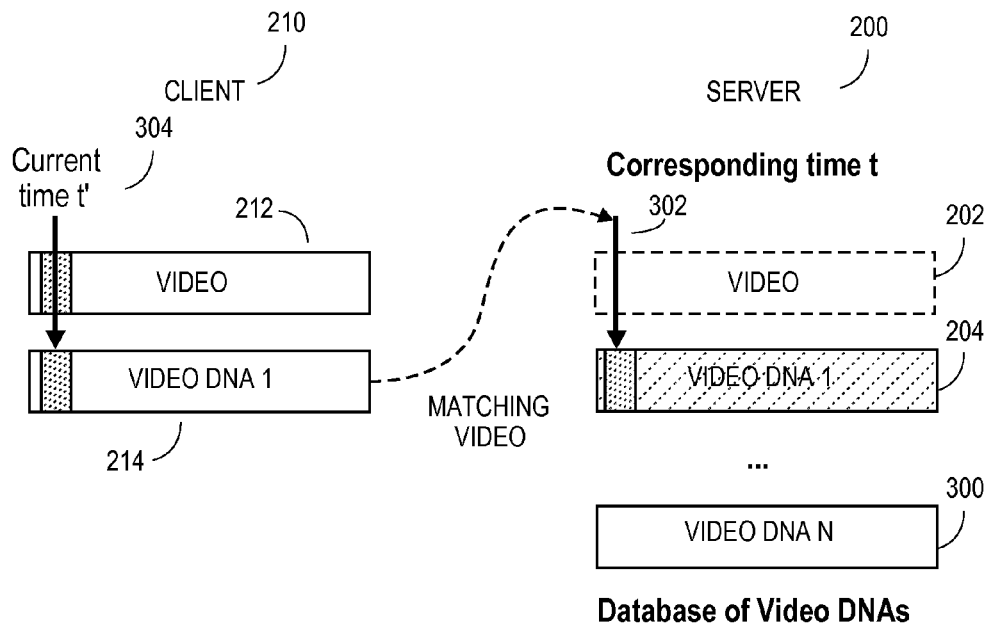
FIG. 3 shows an example of video DNA matching between a client and a server.

FIG. 3 shows an example of video DNA matching between a client and a server. On the server side (200), once the client Video DNA is received (214), this client video DNA can be matched against a server database comprised of a plurality of different server video DNA(204), (300), etc. which can be obtained from many different video media sources as desired. Each of these different server video DNA will usually have their own specific metadata (not shown). Thus a server or database may contain a library of thousands or even millions of different videos. For example, the entire contents of "Youtube.com" could be rated by this method.

If the video being watched on the client has previously been annotated, the result of the client video DNA to server video DNA matching allows the server to identify the video content being watched on the client, and also determine the correspondence between the frame count or time coordinate t (202) between the server video originally used to create the server video DNA, and coordinate t' (304) corresponding to the frame count or time coordinate of the client side video (at least to the time precision corresponding to the length of time of the corresponding video snippet length) currently being viewed. Thus the video media and the video media viewing times t and t' can be matched up even though the server does not have a copy of the video media (102).

Figure 4:
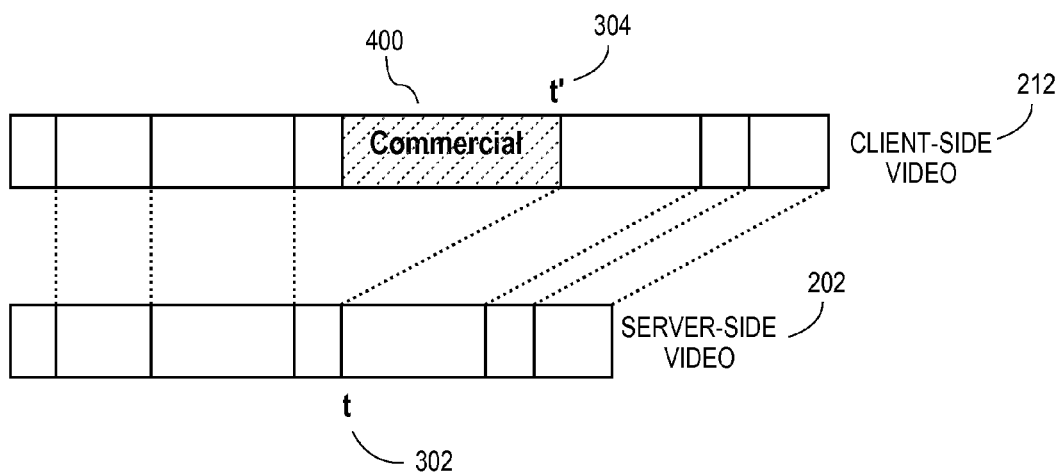
FIG. 4 shows an example of differing time or frame number coordinates between a client video and a server video.

FIG. 4 shows an example of differing time or frame number coordinates between a client video and a server video. In the example of FIG. 4, the time or frame number coordinates "t" (302) and "t'" (304) between the client video (212) and the reference server video (202) will not always exactly coincide. This is because the client-side video can be a modified version of the video that was originally analyzed and annotated on the server side. For example, the client side video may have had a commercial (400) or other content inserted.

Figure 5:
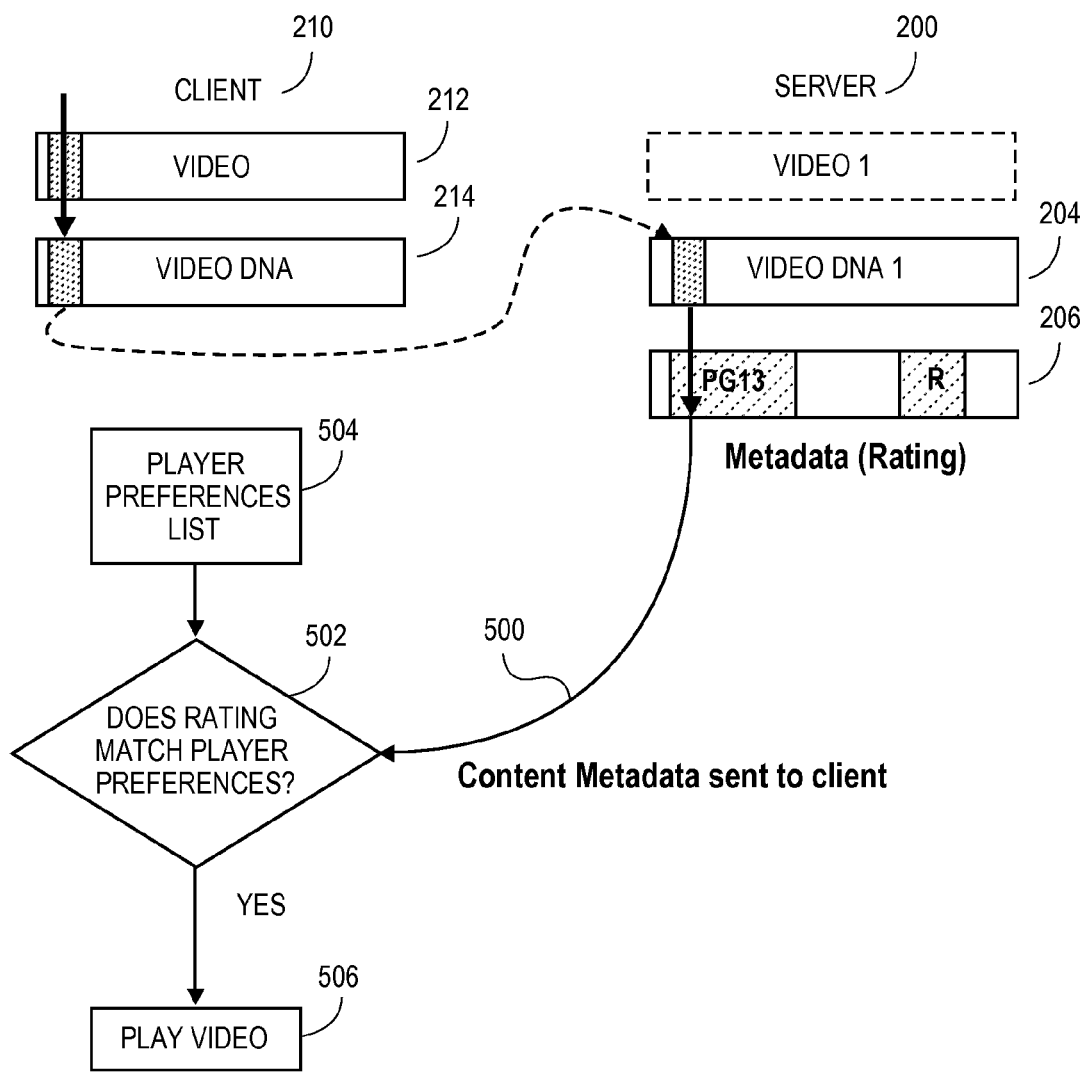
FIG. 5 shows an example of a client retrieving video metadata from a server.

FIG. 5 shows an example of a client retrieving content metadata from a server. Here, the server side metadata (206), corresponding to the video (212) previously determined to be matching in FIGS. 3-4, is retrieved and is sent (500) back to the client (210). Here the content metadata from the server is compared (502) with the content metadata previously stored on a client player preferences list (504). If the content information (500) from the server is acceptable according to the player preferences list (504), then the client (e.g., a video player) will show (e.g., play) the video (506).

Figure 6:
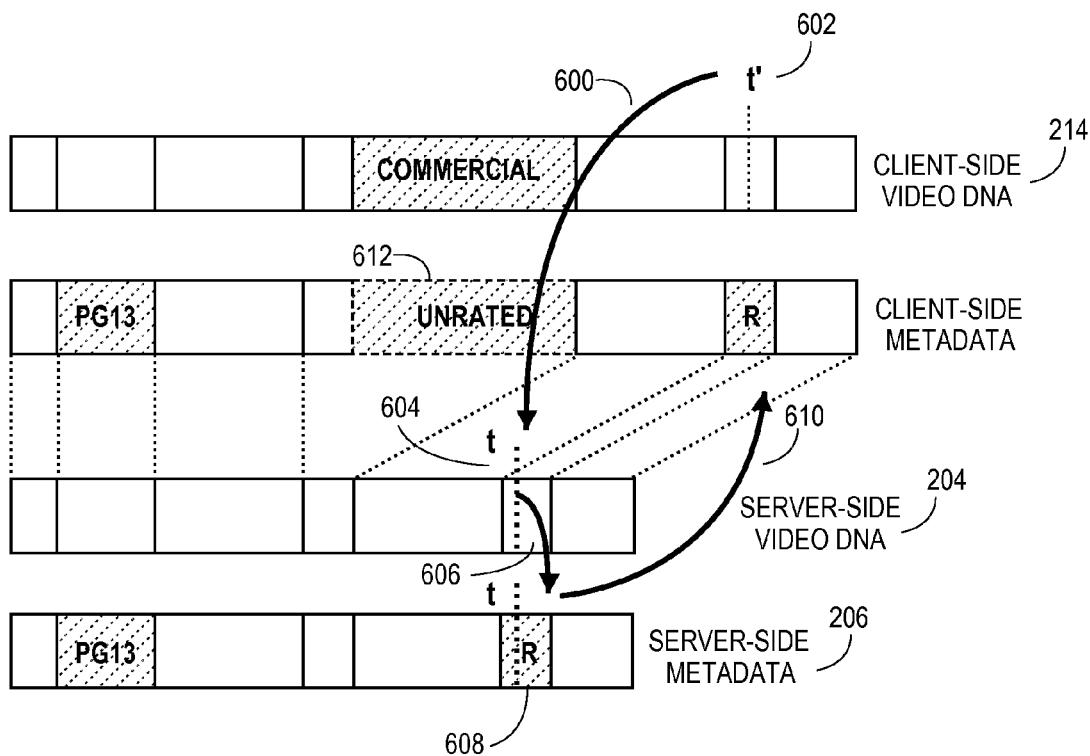
FIG. 6 shows an example of the video metadata retrieval process in more detail.

FIG. 6 shows an example of the metadata retrieval process of FIG. 5 in more detail. After the client side video DNA index (214) is used to first find the correct server side video DNA (204) match (FIG. 3), the client side video DNA index (214) is then used as an index into the server video DNA database to determine the exact match between the client system of temporal coordinates t' (602) and the server system of coordinates t (604). After this video DNA match has been determined, the server looks up (606) the metadata in the database (206) that corresponds to this match. Here for example, client side time coordinate t' (602) corresponds to server side video DNA time coordinate t (604), and the matching metadata (608) for this time coordinate t indicates that this portion of the client video has an "R" content rating.

The server can then transmit the "R" rating (610) back to the client. Depending upon the rating (client side metadata), the client can then take various specific actions. For example, the "R" rated content rated as violent or requiring parental guidance can be blanked out or skipped. In this example, the portions of the video without corresponding metadata (e.g., content inserted in the client-side video) (612) are considered to be unrated.

As previously discussed, the video media (or video content) is typically broken into a series of shorter time segments or snippets, typically between a fraction of a second and a few seconds long, and signatures are computed from these various time segments. Signatures can be computed by a variety of methods, including taking hash functions of the binary contents of each video time segment. One drawback of such hash function techniques, however is that these methods are typically not very robust to the changes in video resolution, frame rate, cropping, insertion or deletion of material that may occur between a reference video that has been content rated, and an unknown client copy video that is being viewed. Thus for many purposes, a video signature method that computes robust video signatures that can still be compared between video media with different resolution, frame rate, cropping, insertion and deletion of material, etc. is desirable.

For these purposes, the video DNA signature methods of 61/045,278, "Video Genomics: a framework for representation and matching of video content", filed Apr. 15, 2008, (the disclosure of which is incorporated by reference herein), are useful. Briefly, the video DNA method creates robust signatures by first analyzing a series of time successive image frames (portions) of the video media for robust image features and feature descriptors. As previously discussed, the features are robust because they are typically chosen so as to be invariant with respect to video resolution, orientation, or lighting. Examples of such robust features include Scale Invariant Feature Transform (SIFT) descriptors, spatio-temporal SIFT descriptors, or Speeded Up Robust Features (SURF) descriptors.

Once the features are determined, feature descriptors of the visual content of the video image regions surrounding the features are then computed. These feature descriptors are then mapped (e.g., assigned, binned), often using a nearest neighbor fit to a standardized array or "library" of different feature descriptors. As used herein, feature descriptors may also be described as "features". The reason why a standardized array or library of feature descriptors is useful is that this creates a common vocabulary by which the video image contents of many different videos may be directly compared.

Once the various feature descriptors from a time segment of video have been binned or assigned to a standardized vocabulary, set, or library of feature descriptors, the number of each type of assigned feature descriptor in each time segment or time successive portions of the video media is counted. The result of this counting is a series of coefficients for the various feature descriptors in the standardized library. This "bag of features", here often called a "nucleotide", is essentially a first vector or array of descriptor coefficients of different descriptors. For example, if a series of 10 video frames has 3 feature descriptors that correspond to library feature descriptor "bin 1", and 5 feature descriptors that correspond to library feature descriptor "bin 2", then the vector or array that describes this series of 10 video frames can be expressed as: (3, 5). Usually hundreds or thousands of different feature descriptors are used for a video, so the actual vector sizes are correspondingly large.

Figure 7:
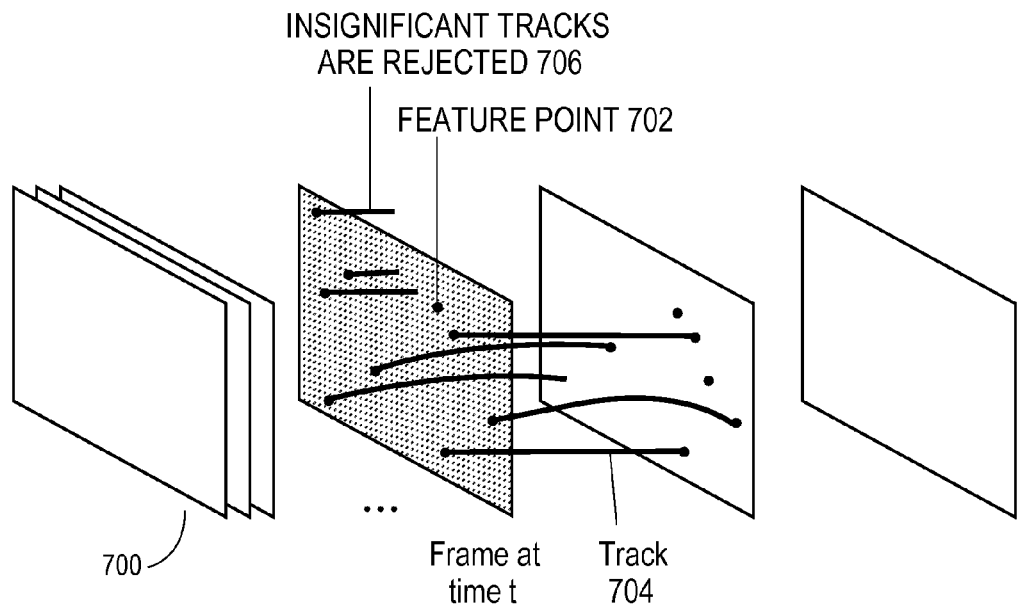
FIG. 7 shows an example overview of the video DNA generation process.

An example overview of this video DNA generation process is shown in FIG. 7. Here, a local feature detector is applied in a frame-wise manner to the various image frames of the video sequence (700). This feature detector finds points of interest (702), also referred to as "feature points", in the video sequence. As previously discussed, many different types of feature detectors may be used, including the Harris corner detector (C. Harris and M. Stephens "A combined corner and edge detector", Alvey Vision Conference, 1988), the Kanade-Lucas algorithm (B. D. Lucas and T. Kanade, "An iterative image registration technique with an application to stereo vision", 1981) SIFT scale-space based feature detectors (D. G. Lowe, Distinctive image features from scale-invariant keypoints, IJCV, 2004) and others. Generally, this feature detection algorithm is designed in such a way that the feature descriptors are robust or invariant to spatial distortions of the video sequence (e.g., change of resolution, compression noise, etc.).

In order to reduce transient noise and focus on the most useful features, the features are often tracked over multiple frames (704), and features that appear for too short a period are deleted or pruned (706).

Figure 8:
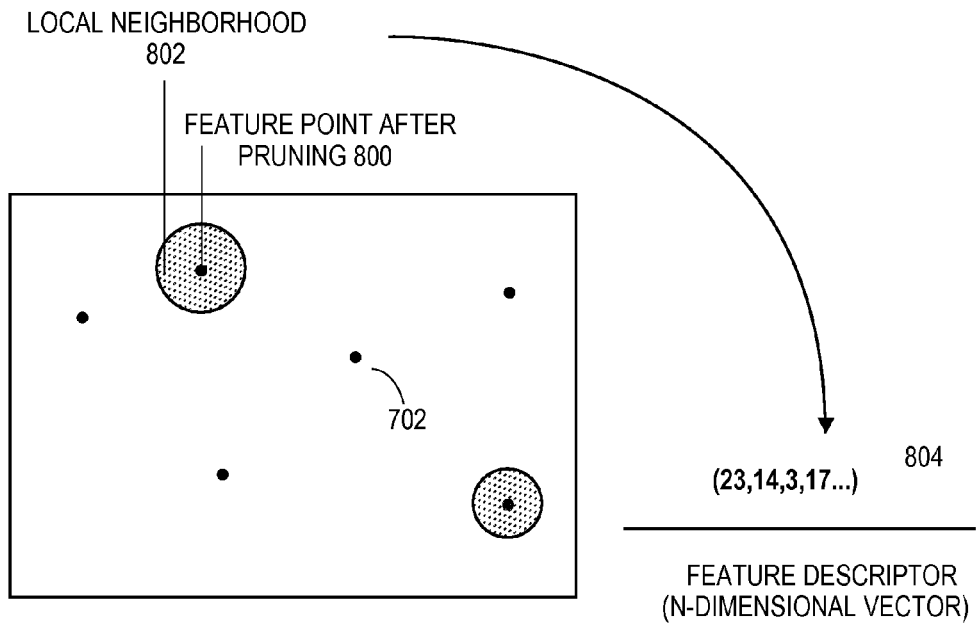
FIG. 8 shows an example of how video features are processed during video DNA generation.

The next stage of the video DNA generation process is shown in FIG. 8. Here FIG. 8 shows a detail of one video image frame, where the dots in the frame (702) correspond to image features that have been detected. Here the feature points remaining after feature pruning (800) are then described using a local feature descriptor. This feature descriptor generates a second type of vector that represents the local properties (local neighborhood) (802) of the video frame around a feature point (800). As previously discussed, many different algorithms can be used to describe the properties of the video image frame around a feature point. These algorithms can include a local histogram of edge directions, the scale invariant feature transform (SIFT), the speed up robust features (SURF) algorithm (H. Bay, T. Tuytelaars and L. van Gool, "Speed up robust features", 2006).

Mathematically, this feature descriptor can be represented as a second type of vector that describes the local properties of video image (804) associated with each feature point. This second type of vector of values can correspond to many types of properties of the local neighborhood (802) near the pruned feature point (800). Some vector coefficients (804) could correspond to the presence or absence of image edges at or near point (800), others may correspond to the relative image brightness or color near point (800), and so on. Thus a video DNA "nucleotide" or signature that describes a video "snippet" (short temporal series of video frames) contains two types of vectors: a first type of vector that tells how many different types of feature descriptors are in the snippet, and a second type of vector that is used to mathematically describe the properties of each of the individual feature descriptors.

In order to create a standardized process that can enable many different videos to be easily compared, rather than using descriptors that are unique to each segment of video, it is often desirable to create a standardized library of descriptors that can be used for many different videos, and do a best fit to "map", "bin", or "assign" the descriptors from any given video into this standardized library or "vocabulary".

Figure 9:
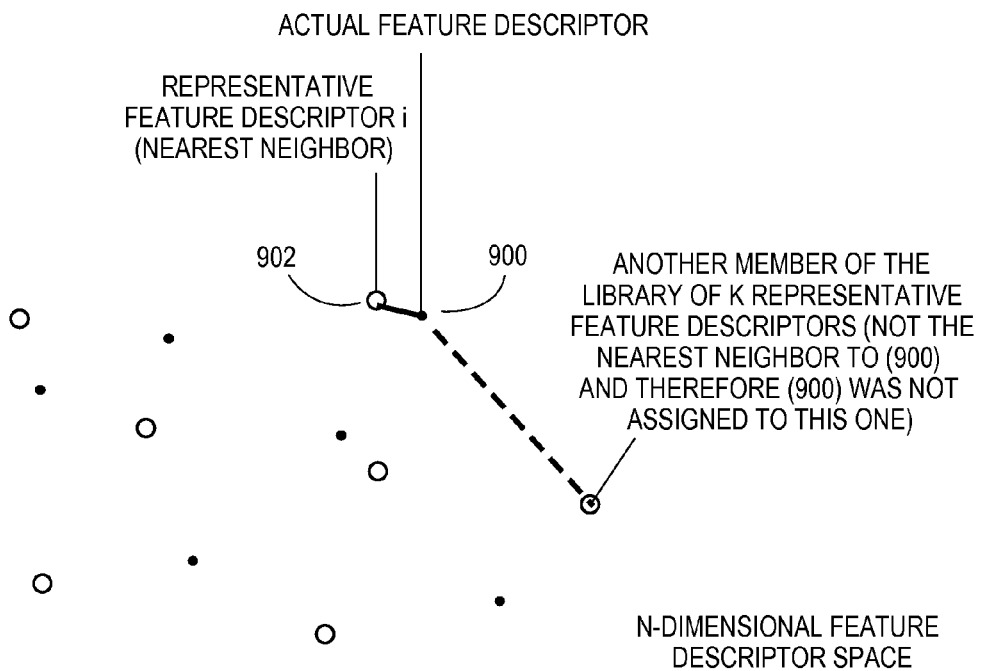
FIG. 9 show an example of how video feature descriptors are binned into a standardized library (visual vocabulary) of feature descriptors.

In FIG. 9, as previously discussed, the actual feature descriptors (900) for the visual environment around each pruned feature point (FIG. 8, 800) are then assigned to "bins" according to the "visual library" or "visual vocabulary" which is a pre-computed set of feature descriptor types. This visual vocabulary can be viewed as a standardized library of feature descriptors. Here, a finite set (usually around 1000 or more) of "ideal" representative feature descriptors is computed, and each "real" feature descriptor is assigned to whatever "ideal" feature descriptor in the "visual vocabulary" most closely matches the "real" feature descriptor. As a result, each "real" feature descriptor (900) from the portion of the actual video is binned into (or is replaced by) the corresponding closest element in the visual vocabulary (902), and only the index (i.e., the fact that this particular library feature descriptor had another closed neighbor) of the closest "ideal" or representative descriptor is stored, rather than the real descriptor (900) itself.

From a nomenclature standpoint, features represented this way will occasionally be referred to in this specification as "visual atoms". As a rough analogy, the visual vocabulary can be viewed as a "periodic table" of visual atoms or elements. Continuing this analogy, the visual vocabulary can be thought of as a "periodic table" of visual elements.

Figure 10:
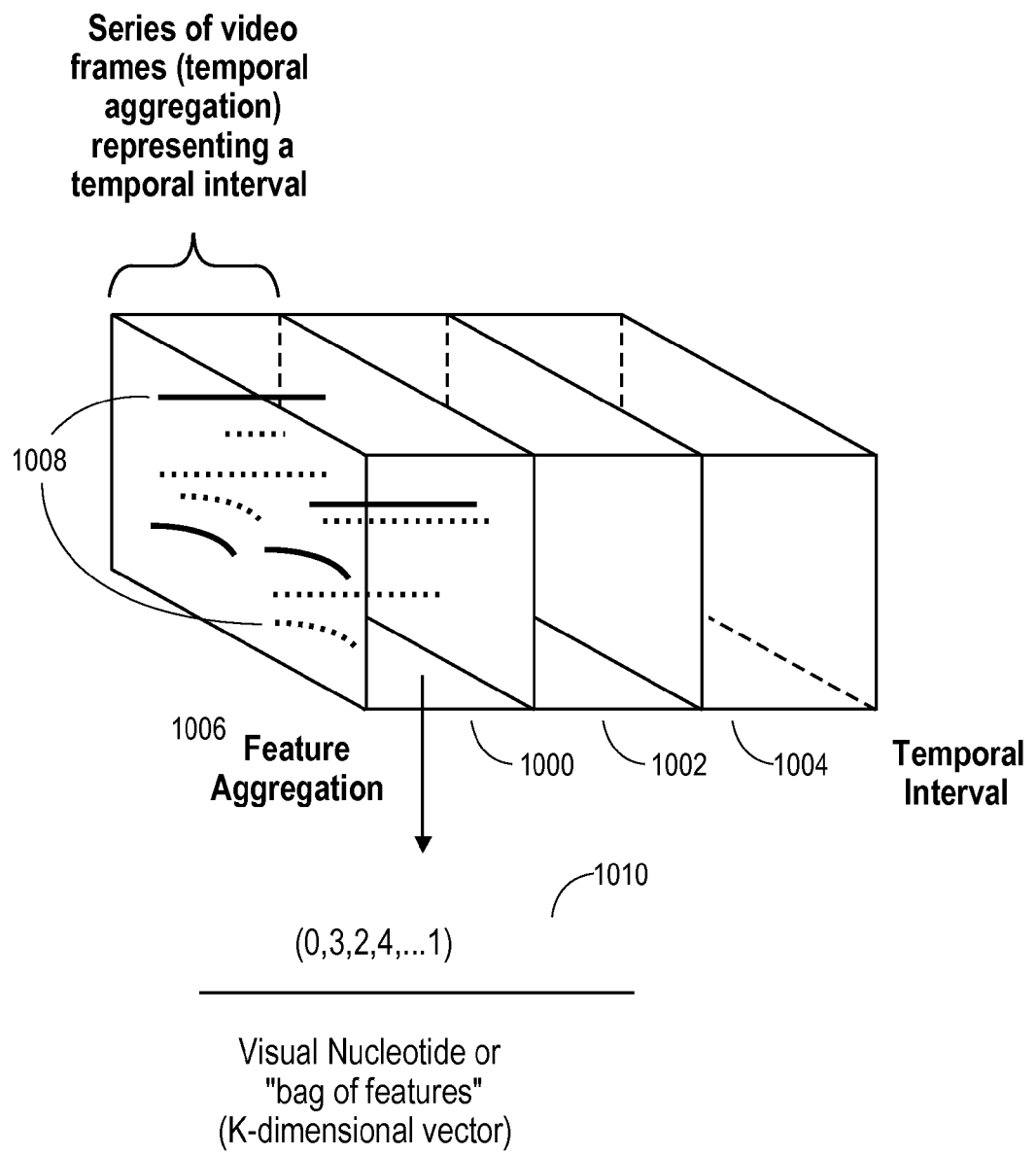
FIG. 10 shows an example of how video is segmented into various short multiple-frame intervals or "snippets" during the video DNA creation process.

FIG. 10 gives additional details showing how the original video is segmented into multiple-frame intervals (temporal segmentation). In this stage, the video sequence is segmented into various time (temporal) intervals or snippets (1000), (1002), (1004), etc. These intervals can be of fixed size (e.g., every 10 frames represents one interval), or of variable size, and can be either overlapping or non-overlapping. Often it will be convenient to track features, and segment the video into regions where the features remain relatively constant, which will often correspond to a particular cut or edit of a particular video scene. Such segmentation can be done, for example, based on the feature tracking from the previous stage. It should be noted that the segmentation is usually done automatically by a pre-determined algorithm.

Next, the now visual-vocabulary-binned visual feature descriptors (visual atoms) in each temporal interval are combined (aggregated) (1006). Here, the space and time coordinates of the features themselves (1008) are not used, rather it is the sum total of the different types of feature descriptors present in the series of video frames (temporal interval) that is used here. This process essentially ends up creating a histogram, vector, or "bag of feature (descriptors)" (1010) for each series of video frames. The frequency of appearance of the various binned feature descriptors (visual atoms) can be represented as a histogram or vector, and as used herein, this histogram or vector is occasionally referred to as a visual nucleotide.

This "bag of features" method of abstracting or indexing a video has a number of advantages. One advantage is that this method is robust, and can detect relationships between related videos even if one or both of the videos are altered by overlaying pixels over the original frames, spatially edited (e.g., cropped), changed to different resolutions or frame rates, and the like. For example, if one of the video sequences has been modified (e.g., by overlaying pixels over the original frames), the new video sequence will consist of a mixture of features (one set belonging to the original video and the other set belonging to the overlay). If the overlay is not very large (i.e., most of the information in the frame belongs to the original video), it is still possible to correctly match the two visual nucleotides from the two videos by adopting a relaxed matching criteria that determines that the nucleotides (histograms or vectors of features) match with less than 100% correspondence between the two.

Figure 11:
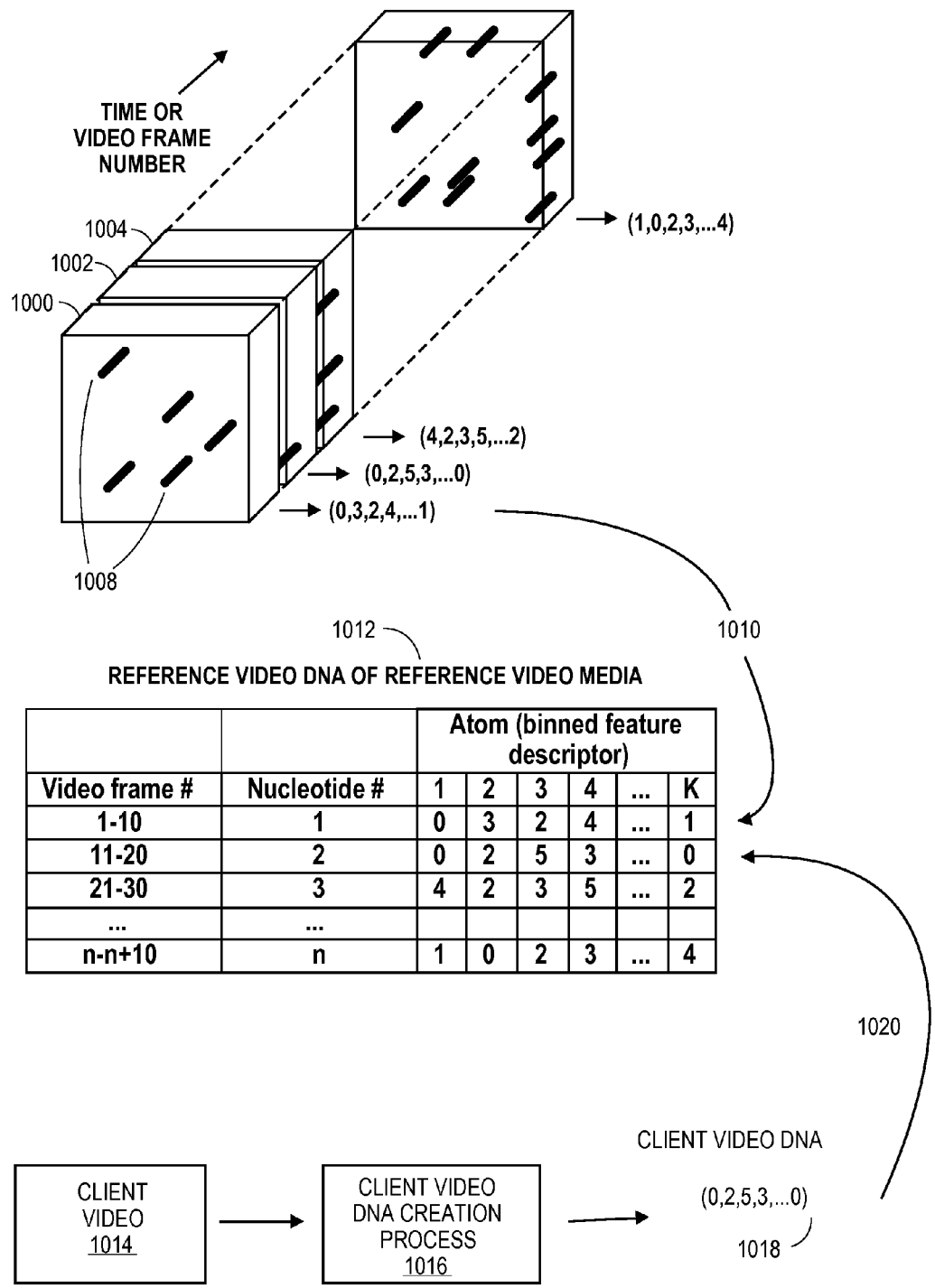
FIG. 11 shows an example of how a video can be indexed and described by its corresponding video DNA.

FIG. 11 shows an example formation of the video DNA for a particular media. Here, the video DNA consists of an ordered array or "sequence" of the different "histograms", "vectors of feature descriptors", or "nucleotides" taken from the various time segments (snippets) (1000), (1002), (1004), etc. of the video. Either video, that is either the original reference video intended for the metadata database on a server, or a client video which can be a copy of the original reference video, can be abstracted and indexed by this video DNA process, and generally the video DNA created from a reference video will be similar enough to the video DNA created by a client video so that one video DNA can be used as an index or match to find a correspondence with the other video DNA.

This reference video DNA (1012) creates an index that allows another device, such as a client about to play a client copy of the reference video, to locate the portion of the video that the client is about to play in the reference or server video DNA database. As an example, a client about to play a client video (1014) can compute (1016) the video DNA of the client video (1018) by the same video DNA process, send the video DNA signature of this client video DNA (1020) to the server or other device holding the reference video DNA, the position and nature of this series of video frames can be determined by using the client video DNA as an index into the server or reference video DNA database (1020). This index in turn can be used to retrieve metadata from the server database that corresponds to the portion of video that is being played on the client.

As previously discussed, even when a relatively large array (i.e. hundreds or thousands) of different feature detection algorithms are used to analyze video images, not all image features will fit neatly into each different feature algorithm type. Some image features descriptors will either not precisely fit into a specific feature descriptor algorithm, or else will have an ambiguous fit. To improve the overall fidelity of the video DNA process, it is often useful to try use nearest neighbor algorithms to try to get the closest fit possible. In the nearest neighbor fit, the actual observed features (feature descriptors) are credited to the counter bin associated with the feature descriptor algorithm that most closely fits the observed feature descriptor.

The temporal matching of client-side and reference video DNAs can be performed using a variety of different algorithms. These algorithms can range from very simple "match/no match algorithms", to bioinformatics-like "dot matrix" algorithms, to very sophisticated algorithms similar to those used in bioinformatics for matching of biological DNA sequences. Examples of some of these more complex bioinformatics algorithms include the Needleman-Wunsch algorithm, described in S. B Needleman, C. D Wunsch, "A general method applicable to the search for similarities in the amino acid sequence of two proteins", 1970; Smith-Waterman algorithm, described in T. F. Smith and M. S. Waterman, "Identification of common molecular subsequences", 1981; and heuristics such as Basic Local Alignment Search Tool (BLAST), described in S. F. Alschul et al., "Basic Local Alignment Search Tool", 1990.

Often, a suitable sequence matching algorithm will operate by defining a matching score (or distance), representing the quality of the match between two video sequences. The matching score comprises two main components: similarity (or distance) between the nucleotides and gap penalty, expressing to the algorithm the criteria about how critical it is to try not to "tear" the sequences by introducing gaps.

In order to do this, the distance between a nucleotide in a first video and a corresponding nucleotide in a second video must be determined by some mathematical process. That is, how similar is the "bag of features" from the first series of frames of one video similar to the "bag of features" from a second series of frames from a second video? This similarity value can be expressed as a matrix measuring how similar or dissimilar the two nucleotides are. In a simple case, it can be a Euclidean distance or correlation between the vectors (bags of features) representing each nucleotide. If one wishes to allow for partial similarity (which frequently occurs, particularly in cases where the visual nucleotides may contain different features due to spatial edits), a more complicated metric with weighting or rejection of outliers can be used. More complicated distances may also take into consideration the mutation probability between two nucleotides: two different nucleotides are more likley similar if they are likely to be a mutation of each other. As an example, consider a first video with a first sequence of video images, and a second video with the same first sequence of video images, and a video overlay. Clearly many video features (atoms, or elements) in the bag describing the first video will be similar to many video features in the bag describing the second video, and the "mutation" here is those vide features that are different because of the video overlay.

The gap penalty is a function accounting for the introduction of gaps between the nucleotides of a sequence. If a linear penalty is used, it is simply given as the number of gaps multiplied by some pre-set constant. More complicated gap penalties may take into consideration the probability of appearance of a gap, e.g. according to statistical distribution of advertisement positions and durations in the content.

Although the term "video DNA" gives a good descriptive overview of the described video signature method, it should be evident that matching the different video nucleotides can be more complex than matching biological nucleotides. A biological nucleotide is usually a simple "A", "T", "G", or "C", whereas a video DNA nucleotide is a more complex "bag of features" (bag of feature descriptors). Thus it is quite often the case that a given video nucleotide will never quite find a perfect match. Rather, the criterion for a "match" is usually going to be a close but not quite perfect match. Often, this match will be determined by a distance function, such as a distance, a L1 distance, the Mahalanobis distance, the Kullback-Leibler divergence distance, the Earth Mover's distance, or other function. That is, an example match is whenever video nucleotide "distance" <=threshold.

A smaller match criteria is considered to be a more stringent match (i.e. fewer video DNA nucleotides or signatures will match with each other), and a larger match criteria is considered to be a less stringent match (i.e. more video DNA nucleotides or signatures will match with each other).

Figure 12:
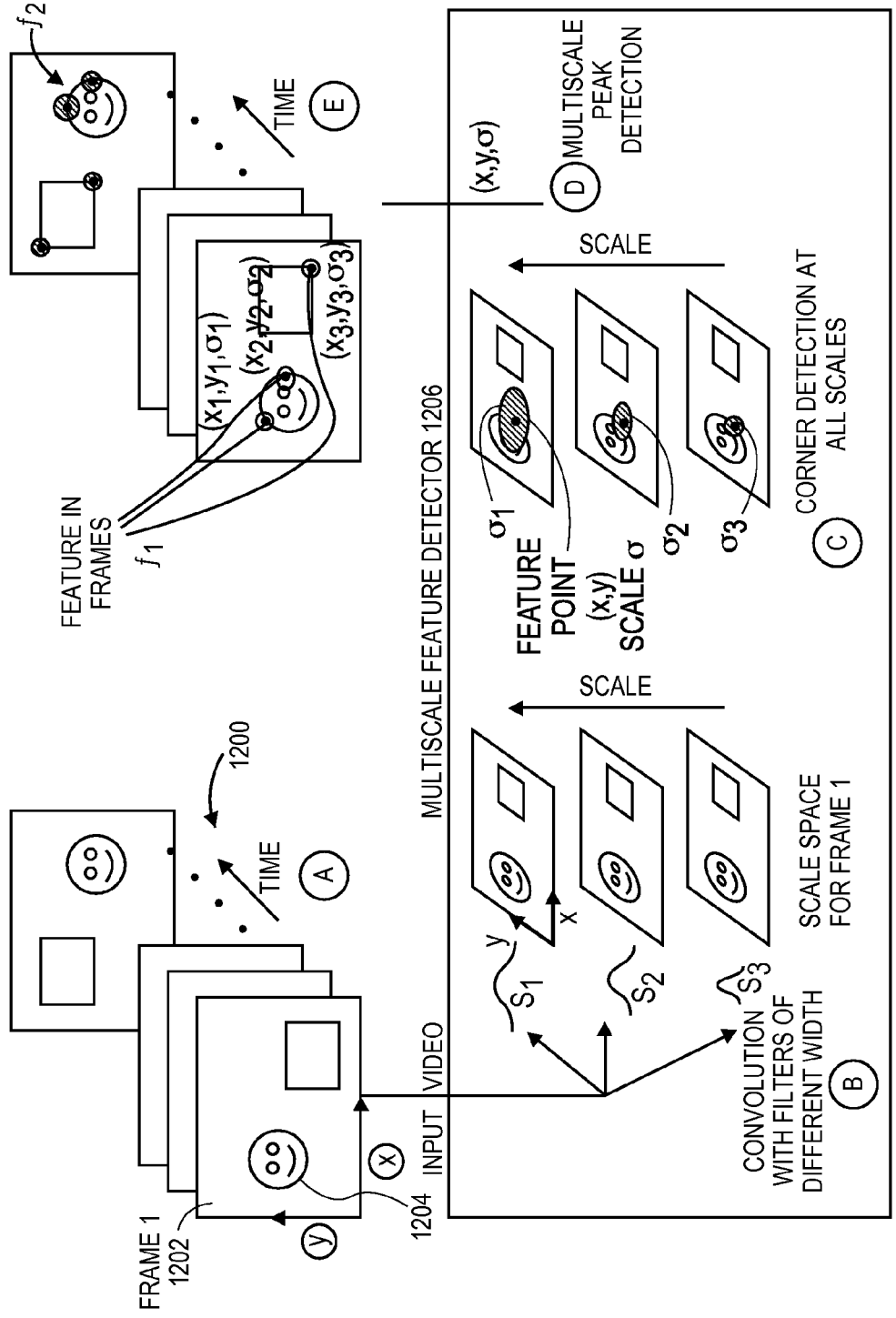
FIG. 12 illustrates an example of the video signature feature detection process.

Referring to FIGS. 12-16, a series of diagrams are shown to illustrate a process configured according to the systems and methods described herein. FIG. 12 illustrates an example of the video signature feature detection process. In this example, an input video (A) is composed of a series of various frames 1200 having a feature image 1204 and an area defined by x and y over a period of time is used as input into a multi-scale feature detector 1206. The video signals s1, s2, s3 are subjected to a convolution with filters of different spatial width (B), producing a series of images with different feature scales of resolution. These different scale space images are then analyzed (for example by corner detection), at the different scales 1, 2, 3 in (C). The picture can then be described by a series of multiscale peaks (D) where certain features f1, f2, in the frames (E) are identified.

Figure 13:
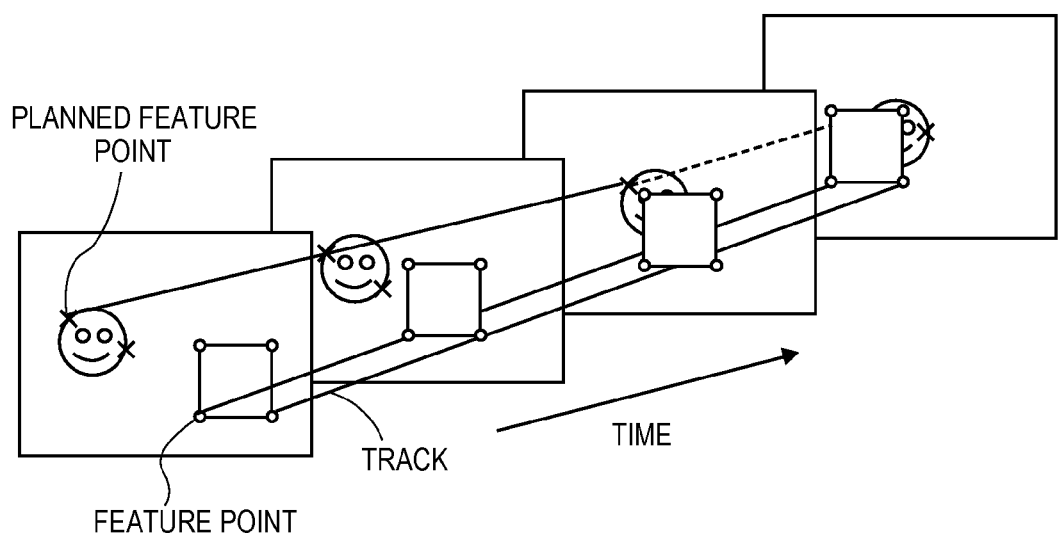
FIG. 13 shows an example of the video signature feature tracking and pruning process.

FIG. 13 shows an example of the video signature feature tracking and pruning process. This is an optional stage, but if it is used, features may be tracked over multiple frames and features that persist for enough (e.g., meet a preset criteria) frames are retained, while transient features that do not persist long enough to meet the criteria are rejected.

Figure 14:
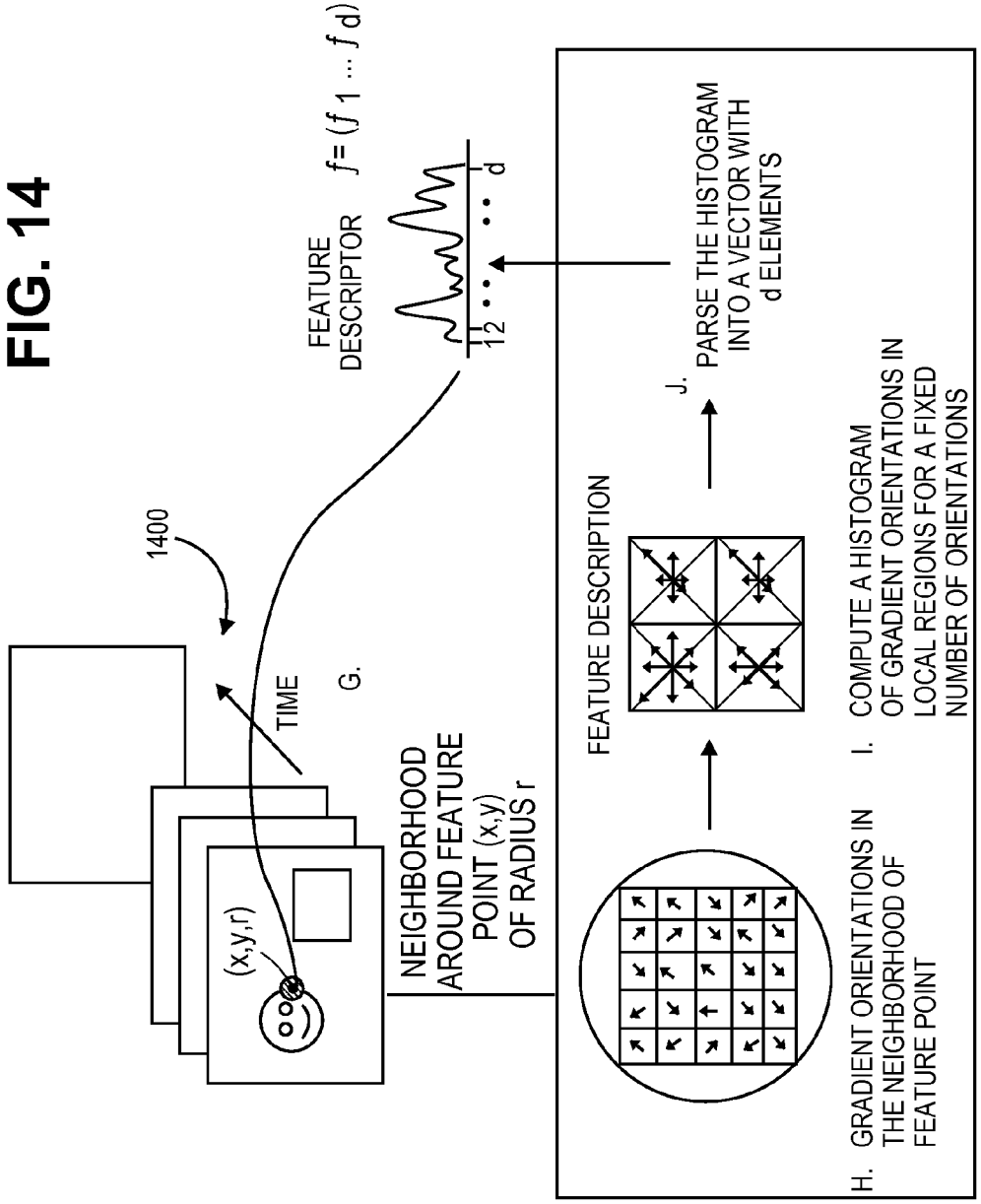
FIG. 14 shows an example of video signature feature description.

FIG. 14 shows an example of video signature feature description. The example of FIG. 14 illustrates how previously detected features can then be described. In general, the process works by again taking the input video 1400, and this time analyzing the video in the neighborhood (x, y, r) around each of the previously detected features (G). This feature description process can be done by a variety of different methods. In this example, a SIFT gradient of the image around the neighborhood of a feature point is computed (H), and from this gradient a histogram of gradient orientations in local regions for a fixed number of orientations is generated (I). This histogram is then parsed into a vector with elements (J), called a feature descriptor.

Figure 15:
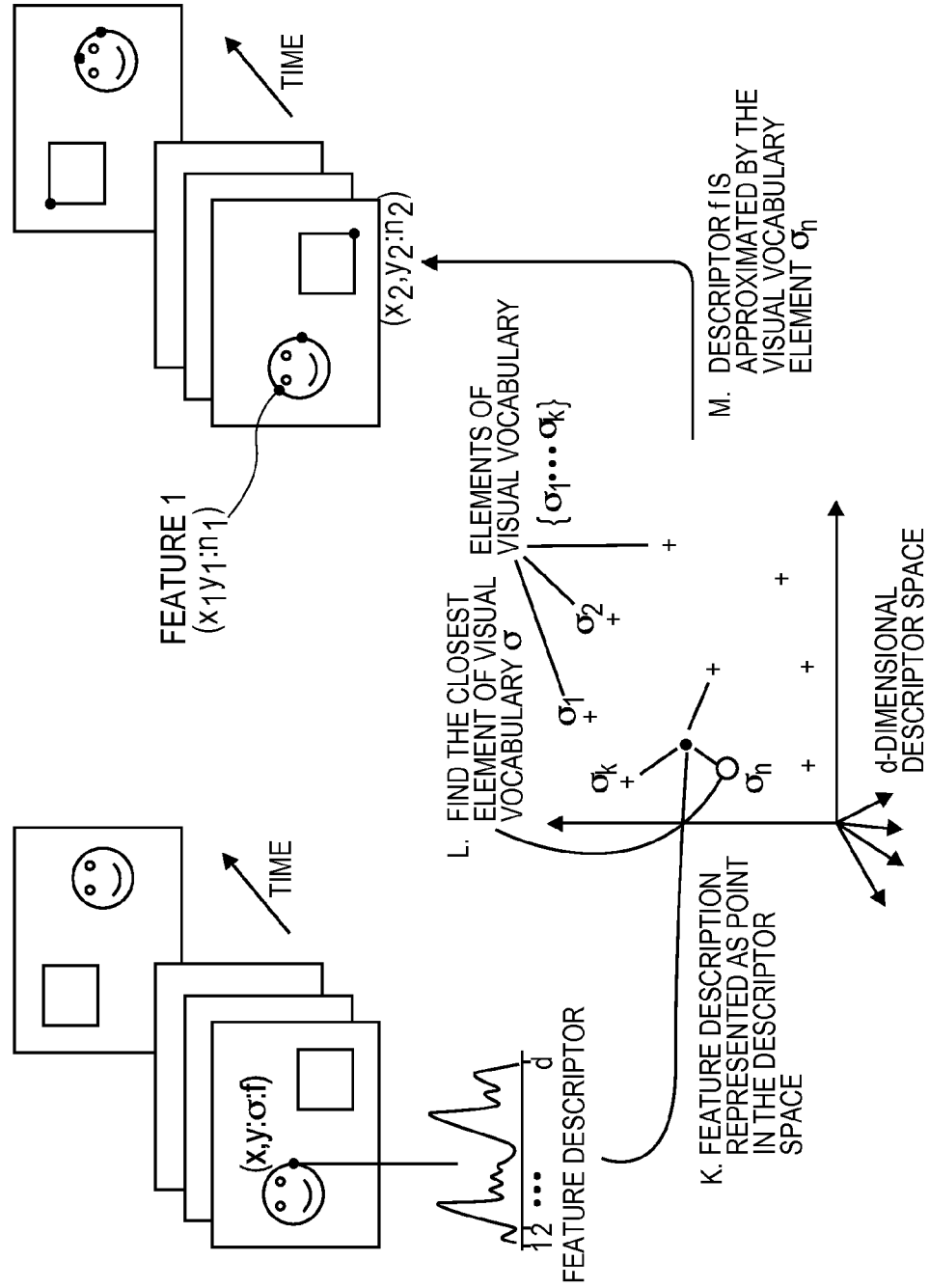
FIG. 15 shows an example of a vector quantization process.

FIG. 15 shows an example of a vector quantization process that maps an image into a series of quantized feature descriptors. In this example, the video image, previously described as a feature descriptor vector (K) with an arbitrary feature descriptor vocabulary, is mapped onto a standardized d-dimensional feature descriptor vocabulary (L). This use of a standardized descriptor vocabulary enables a standardized scheme (M) that is capable of uniquely identifying video, regardless of source.

Figure 16:
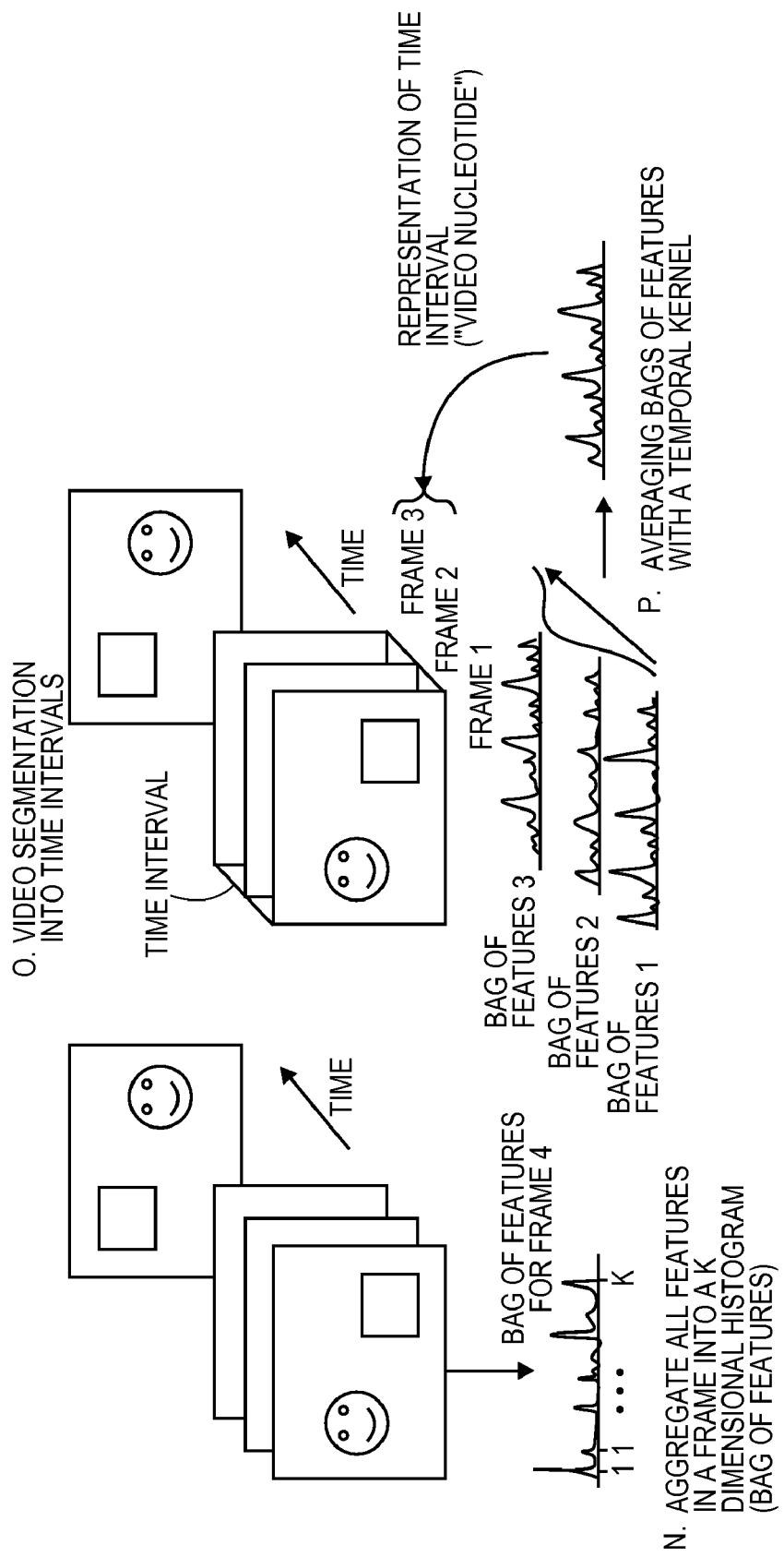
FIG. 16 shows an example of video DNA construction.

FIG. 16 shows an example of video DNA construction. In contrast to standard video analysis, which often analyzes video on a frame-by-frame basis, video DNA often combines or averages bags of features from multiple video frames to produce an overall "video nucleotide" for a time interval. An example of this is shown in FIG. 16. As previously discussed, the video data is analyzed and bags of features for particular frames are aggregated into k dimensional histograms or vectors (N). These bags of features from neighboring video frames (e.g., frame 1, frame 2, frame 3) are then averaged (P), producing a representation of a multi-frame video time interval, often referred to herein as a "video nucleotide".

The video control methods discussed herein may be implemented on many different types of hardware or systems. The video client or local player can be implemented on set-top boxes, embedded into stand alone video or television monitors, implemented on personal video recorders, DVD players, Blu-ray Disc™ players, solid-state video playback devices, Divx players, portable media players (e.g., MP3 players and MP4 players), portable gaming devices, portable computing devices, cellular phones, and the like. The server or video content database may be implemented as a remote server connected to the local player by way of the internet or other network. Alternatively the server or video content database may be stored locally to the local player, or even be embedded into the local player. The rating content database may be stored on the same servers or devices that hold the video media, or may be stored on devices that are entirely separate from the video media.

It should also be understood that the methods discussed herein are typically carried out in a system containing at least one data processor (often a plurality of processors will be used), and memory (often megabytes of even gigabytes of memory will be used). Processors suitable for implementing the methods of the present invention will often be either general purpose processors, such as x86, MIPS, Power, ARM, or the like, or they may be dedicated image interpretation processors, such as video processors, digital signal processors, field programmable gate arrays, and the like. The methods described here may be programmed in a high level language, such as "C", C+", Java, Perl, Python, and the like, programmed in a lower level assembly language, or even embedded directly into dedicated hardware. The results of this analysis may be stored in either volatile memory, such as RAM, or in non-volatile memory such as flash memory, hard drives, CD, DVD, Blu-ray Discs™, and the like.

Figure 17:
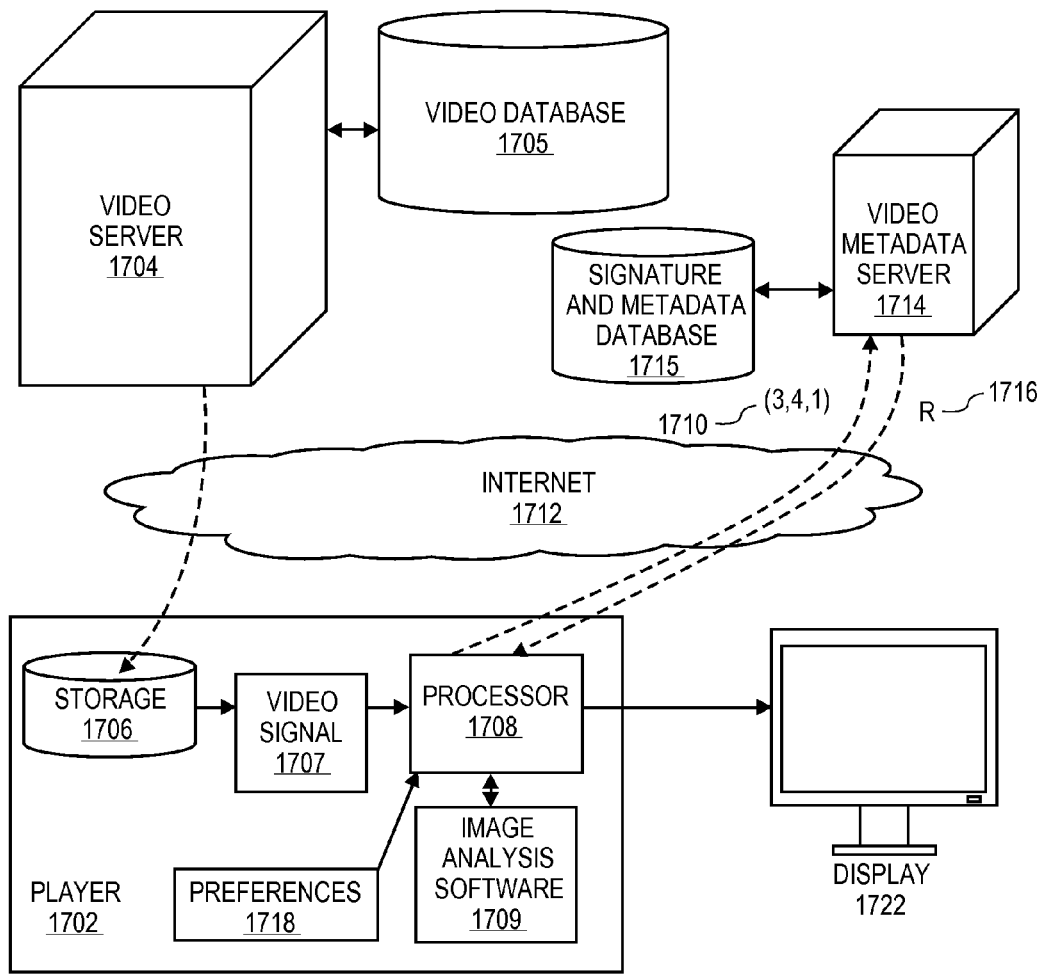
FIG. 17 shows an example client-server system employing content control.

FIG. 17 shows an example client-server system that can be used to implement content control. In this example, the content control system player is embedded into a set-top box (1702). The set top box receives video from a networked video server (1704), and may optionally store this video in the set-top box's onboard data storage (1706). As the video is played back, a processor in the set-top box (1708) analyzes the video images using image analysis software (1709) (or a specialized video DNA processor) and creates video DNA signatures (1710), and in this example sends the signatures by way of a network (such as the Internet) (1712) to a separate networked video metadata server (1714) for content metadata evaluation. The video metadata server (1714) returns the corresponding content metadata (1716). If the content metadata does not match the client viewing preferences (1718), then the processor (1708) in the player may (in this example) skip over the objectionable content and instead display (1722) just the last approved video scene and the next video scene (if approved).

As previously discussed, the fact that the larger database that contains both video signatures and rating information does not need to contain the actual video media opens up a number of new video and media content control business models. For example, third parties who do not themselves own the underlying copyrights to the video media may, by use of the systems and methods discussed herein, nonetheless provide content control for the video media. For example, as shown in FIG. 17, the video metadata server (1714) does not have any connection to the video server (1704). Copyright restrictions are associated with the video server (1704) and video database (1705), while the content control resides on the separate video metadata server (1714) and the signature and metadata database (1715).

Thus the described systems and methods enable nearly anyone, such as private individuals, private organizations, companies, and governments, to produce and publish their own particular video content control channel. As a result, there can be a large number of different and independent video metadata servers (1714) and different signature and metadata databases (1715). Using these systems and methods, a movie critic could provide a web server (not shown) that, to appropriate subscribers, automatically controls the subscriber's video clients to only display video content that the critic has approved. A consumer advocate or religious organization could also produce and publish (via the internet or other means) their own content control scheme (not shown). Another type of content control would only show access to video media judged to be highly popular by a particular peer group (not shown), and so on.

As another example, viewers may decide to slave their viewing preferences to a video content control version of a social rating web site such as "del.icio.us", "dig.com", and the like. Thus the described systems and methods will support and enable new businesses and companies dedicated to helping users focus on the subset of video media that is most appropriate to their particular interests.

Although the components and modules illustrated herein are shown and described in a particular arrangement, the arrangement of components and modules may be altered to perform video processing and content control in a different manner. In other embodiments, one or more additional components or modules may be added to the described systems, and one or more components or modules may be removed from the described systems. Alternate embodiments may combine two or more of the described components or modules into a single component or module. Additionally, the example procedures and methods discussed herein may be performed in any order. Certain procedures and methods (including steps within those procedures and methods) may be omitted and/or performed in a different order for specific implementations.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method to control the display of media content on a media player with player preferences, the method comprising:

analyzing the media content and computing a plurality of signatures representative of temporal portions of the media content;

wherein the signatures are created by:

analyzing a series of time successive portions of the media content for features;

using a nearest neighbor fit to assign the features to a standardized array of different features;

counting the number of each type of assigned feature in the time successive portions of the media content, creating an array of coefficients for the standardized array of different features, wherein the signature consists of the array of coefficients;

wherein the media content is video media content, and the features are chosen so as to be invariant with respect to video resolution, orientation, or lighting;

wherein the type of assigned features is determined by the visual content of the local spatio-temporal region of the video data surrounding the feature (feature descriptors);

matching the plurality of signatures to a database of signatures;

finding the closest corresponding signatures;

retrieving the metadata associated with the closest corresponding signatures as matching metadata;

and controlling the display of the media content using the player preferences and the matching metadata.

2. The method of claim 1, wherein the plurality of signatures are input signatures.

3. The method of claim 1, wherein signatures contained in the database of signatures are reference signatures.

4. The method of claim 1, wherein the metadata contains rating of a portion of the media content associated therewith.

5. The method of claim 1, wherein the media content is video media content.

6. The method of claim 1, wherein if the correspondence between the player preferences and matching metadata is not approved by the player preferences, the display of the media content images skips past the not approved media content and resumes playing at the next set of approved media content.

7. The method of claim 1, wherein the plurality of signatures are stored on a networked metadata server and the media content is stored on either a network media content server that is different from the metadata server, on the media player, or on a local client storage device.

8. The method of claim 1, wherein the signatures are generated on at least one processor using at least one media content feature recognition algorithm.

9. The method of claim 1, wherein the player preferences comprise preferences for ratings of content suitable for children, adult content, sexual content or violence.

10. The method of claim 1, wherein the feature descriptors are SIFT descriptors, spatio-temporal SIFT descriptors, or SURF descriptors.

11. A method to control the display of video media on a media player with player preferences, the video media existing as a first video media copy and a second video media copy, the method comprising:

identifying a first plurality of signatures associated with the first video media copy, wherein the first plurality of signatures are representative of temporal portions of the first video media copy;

wherein the signatures are created by:

analyzing a series of time successive portions of the media content for features;

using a nearest neighbor fit to assign the features to a standardized array of different features;

counting the number of each type of assigned feature in the time successive portions of the media content, creating an array of coefficients for the standardized array of different features, wherein the signature consists of the array of coefficients;

wherein the media content is video media content, and the features are chosen so as to be invariant with respect to video resolution, orientation, or lighting;

wherein the type of assigned features is determined by the visual content of the local spatio-temporal region of the video data surrounding the feature (feature descriptors);

associating the first plurality of signatures with metadata;

storing the first plurality of signatures and associated metadata in a first signature database;

identifying a second plurality of signatures associated with the second video media copy prior to being displayed on the media player, wherein the second plurality of signatures are representative of temporal portions of the second video media copy;

matching the second plurality of signatures to the first signature database;

retrieving the stored signature metadata that best corresponds to the second video media copy input signatures (matching metadata);

and controlling display of the second video media copy based on the correspondence between the player preferences and matching metadata.

12. The method of claim 11, wherein if the correspondence between the player preferences and matching metadata is not approved by the player preferences, the display of video images skips past the not approved second video media copy and resumes playing at the next set of approved second video media copy.

13. The method of claim 11, wherein the first signature database is stored on a networked metadata server, and the second video media copy is stored on either a network video content server that is different from the metadata server, on the media player, or on a local client storage device.

14. The method of claim 11, wherein the second plurality of signatures are generated on at least one processor using at least one feature recognition algorithm.

15. The method of claim 11, wherein the player preferences comprise preferences for ratings of content suitable for children, adult content, adult sexual content or violence.

16. The method of claim 11, wherein the feature descriptors are SIFT descriptors, spatio-temporal SIFT descriptors, or SURF descriptors.

17. A video media player comprising:

a player control module configured to play video image signals and sound signals from either local or remotely stored video media, a storage device configured to store at least one player preference;

a database of signatures and associated signature metadata;

wherein the signatures are created by at least one processor that:

analyzing a series of time successive portions of the media content for features;

using a nearest neighbor fit to assign the features to a standardized array of different features;

counting the number of each type of assigned feature in the time successive portions of the media content, creating an array of coefficients for the standardized array of different features, wherein the signature consists of the array of coefficients;

wherein the media content is video media content, and the features are chosen so as to be invariant with respect to video resolution, orientation, or lighting;

wherein the type of assigned features is determined by the visual content of the local spatio-temporal region of the video data surrounding the feature (feature descriptors);

and a processor configured to analyze the video media as it is about to be played back and computing a plurality of signatures representative of temporal portions of the video media about to be played back, wherein the plurality of signatures are matched with the signatures stored in the database and associated signature metadata, wherein the signature metadata that best corresponds to the plurality of signatures is retrieved (matching metadata);

and wherein a correspondence between the player preferences and the matching metadata is used to control the playback of video media on the video media player.

18. The video media player of claim 17, wherein if the correspondence between the player preferences and matching metadata is not approved by the player preferences, the video media player skips past the not approved video media and resumes playing at the next set of approved video media.

19. The video media player of claim 17, wherein the signatures are stored on a networked metadata server, and the video media is stored on either a network video content server that is different from the metadata server, on the video media player system, or on a storage device that is local to the video media player.

20. The video media player of claim 17, wherein the signatures are generated on the processor using one or more feature recognition algorithms.

21. The video media player of claim 17, wherein the player preferences comprise preferences for ratings of content suitable for children, adult content, adult sexual content or violence.

22. The video media player of claim 17, wherein the video image signals and sound image signals from the video media player are presented by a display device.

23. The video media player of claim 17, wherein the video media is stored in a digital data storage device located on or local to the video media player.

24. The video media player of claim 17, wherein the player preferences are either stored in memory located on or local to the video media player, or are stored on an external networked device.

25. The video media player of claim 17, wherein the database of signatures and associated signature metadata is stored on an internet server.

26. The video media player of claim 25, wherein the internet server that stores the database of signatures and associated stored signature metadata does not store the video media.

27. The video media player of claim 17, wherein the video media used to generate the signatures has a different resolution or screen aspect ratio or is a differently edited version of the video media that is played on the video media player.

28. The video media player of claim 17, wherein playback of video media on the video media player is controlled by series of multiple matching metadata.

29. The video media player of claim 17, wherein the series of time successive video images comprises at least 10 video images.

30. The video media player of claim 17, wherein the feature descriptors are SIFT descriptors, spatio-temporal SIFT descriptors, or SURF descriptors.

* * * * *